STABILIZED SYNCHRONIZING SYSTEM

Filed Oct. 27, 1952

INVENTOR.
JOHN F. BIGELOW
BY
Lockwood, Galt, Woodard, & Smith
ATTORNEYS

United States Patent Office 2,838,605

Patented June 10, 1958

2,838,605

STABILIZED SYNCHRONIZING SYSTEM

John F. Bigelow, Fort Wayne, Ind., assignor to International Telephone and Telegraph Corporation, a corporation of Maryland Application October 27, 1952, Serial No. 317,026

13 Claims. (Cl. 178—69.5)

The present invention relates to a synchronizing system for use in television receivers, and more particularly to a signal synchronizing circuit for improving the stability of the horizontal scanning circuits used in a television receiver.

In accordance with conventional practice, television receivers are provided with suitable circuitry for stabilizing and synchronizing line scansion by the picture tube in accordance with the synchronizing signals included in the composite video signal transmitted by a television transmitter. This circuitry conventionally includes a synchronizing signal separating circuit which serves the purpose of separating the vertical and horizontal synchronizing signals from the composite video signal for use by the vertical and horizontal scanning circuits respectively. Also in conventional systems, the horizontal deflection scanning circuit utilizes an oscillator which produces a sine wave in substantial phase synchronism with the horizontal synchronizing signal included in the aforementioned composite video signal. Since in order to obtain an accurate reproduction of the transmitted picture it is necessary for the horizontal oscillator to be in exact synchronism with the transmitted signals, an automatic frequency controlling circuit is used for maintaining the necessary phase relationship between the horizontal synchronizing signals and the oscillations produced by the horizontal oscillator. In one conventional system, the horizontal synchronizing signal derived from the synchronizing signal separator is fed to a phase discriminating circuit which is inductively coupled to the horizontal oscillator. An automatic frequency controlling circuit is connected between the discriminating circuit and the horizontal oscillator for utilizing a control signal generated by the discriminating circuit for maintaining the frequency of the horizontal oscillator in step with the horizontal synchronizing signal.

If nose signals corresponding to the horizontal carrier synchronizing signal are fed to the discriminating circuit, it is obvious that the frequency of the horizontal oscillator will shift in response to the noise signals and thereby destroy the scanning synchronism necessary to reproduce the picture in the picture tube.

It is therefore an object of this invention to provide in a television receiver means for preventing the communication of noise pulses to the discriminating circuit thereby preventing the horizontal oscillator from becoming improperly controlled by noise signals.

It is another object of this invention to provide a circuit in a television receiver for improving the synchronization of the horizontal scanning signal applied to the picture tube with the horizontal carrier synchronizing impulse.

It is another object of this invention to provide in a television receiving system an arrangement for increasing noise immunity in the horizontal scanning circuits for improving the synchronization of horizontal scanning.

It is still another object of this invention to provide in a television receiver an auxiliary picture synchronizing signal which may be utilized as the primary scanning frequency controlling source and which may be isolated from unwanted or noise signals which may appear in the carrier signal or which may be developed by some portion of the receiver circuitry.

Other objects will become apparent as the description proceeds.

In accordance with this invention it is proposed to utilize the horizontal synchronizing signal normally derived from the synchronizing signal separating circuit to generate an artificial or auxiliary synchronizing signal which is fed to the conventonal television receiver discriminating circuit for controlling the frequency of the horizontal scanning oscillator, this artificial synchronizing signal being "gated" or conducted through to the discriminating circuit only during the occurrence of the scanning retrace impulse as supplied to the picture tube, this retrace impulse being so phased as to occur simultaneously with the artificial synchronizing signal. A specific arrangement whereby the foregoing may be accomplished is illustrated in the drawings and described hereafter.

To the accomplishment of the above and related objects, my invention may be embodied in the forms illustrated in the accompanying drawings, attention being called to the fact, however, that the drawings are illustrative only, and that specific changes may be made in the specific constructions illustrated and described, so long as the scope of the appended claims is not violated.

Figure 1:
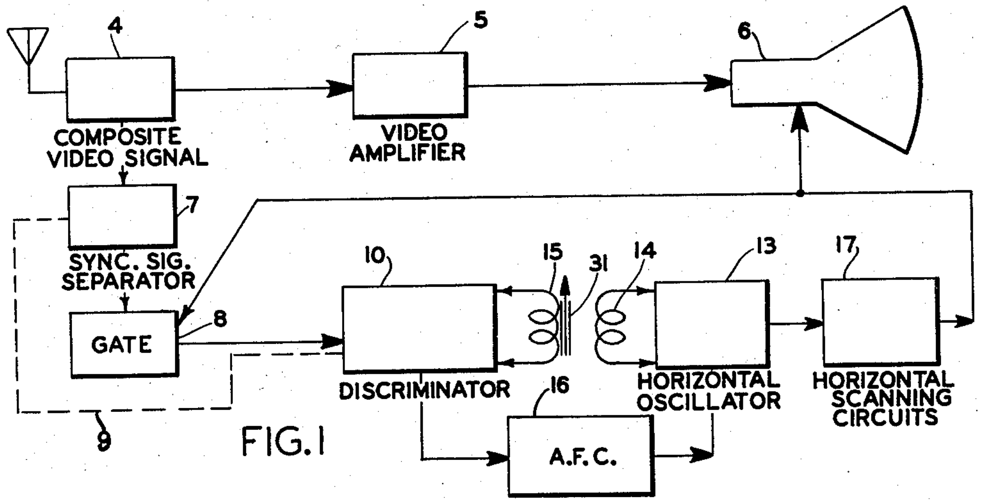
Fig. 1 is a block diagram of an embodiment of this invention.
Figures 2, 3:
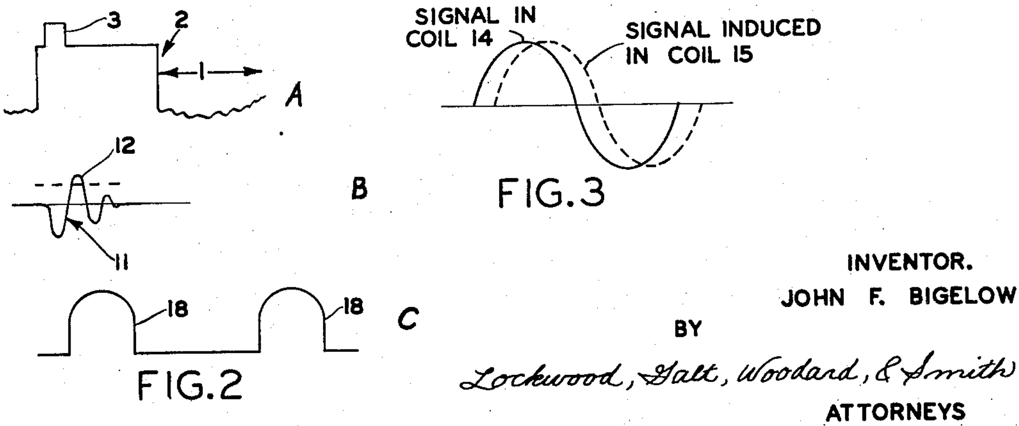
Fig. 2 is a graphic representation of the waves utilized by the foregoing diagram.
Fig. 3 is an illustration showing the phase relationship between the wave forms occurring in the horizontal oscillator and the discriminating circuit.

With reference to the drawings, and more particularly to Figs. 1, 2 and 3, the composite video carrier signal as transmitted by the television transmitter is shown in part by graph A of Fig. 2. This signal comprises the video information designated by the reference numeral 1, the usual blanking pulse 2, and the horizontal synchronizing signal 3 which appears as being superimposed on the blanking signal 2 in between the leading and trailing edges of the latter. This signal is coupled into the usual radio frequency and demodulating stages of the receiver, as indicated by the reference numeral 4, and amplified by the video amplifier 5 which is coupled to the picture tube 6. A synchronizing signal separator 7 which serves the purpose of separating the horizontal and vertical synchronizing signals for use by the associated vertical and horizontal scanning circuits, respectively, is coupled to the circuit 4, and has its horizontal synchronizing output circuit coupled to a gating circuit 8 which produces an artificial or auxiliary synchronizing signal (graph B, Fig. 2) as mentioned earlier. The dotted line connection 9 indicates the usual conventional arrangement of coupling the horizontal synchronizing signal output circuit of the separator 7 to the usual phase discriminating circuit 10, but in the present invention, this connection 9 is replaced by the gating circuit 8.

As seen in Fig. 2, the synchronizing signal 3 of graph A which is separated from the composite video signal, is used to generate the wave shown in graph B, this wave generally indicated by the reference numeral 11, being coupled to the discriminating circuit 10 and used in the conventional manner by this circuit as the primary horizontal synchronizing impulse. Specifically, it is the second half cycle 12 of this wave 11 which replaces the usual synchronizing signal produced by the impulse 3, this impulse 12 serving to control the frequency of the usual horizontal sine wave oscillator 13 which is inductively coupled back into the discriminating circuit 10 by means of the customary inductances 14 and 15, respectively. A conventionally used automatic frequency controlling circuit 16 is operative under the influence of the control signal produced by the discriminator 10 to synchronize the frequency of the oscillator 13 with the occurrence of the pulse 12, this synchronizing action occurring in the same manner as if the horizontal synchronizing impulse 3 or the usual signal produced thereby, were used.

Thereafter, the sine wave signal produced by the horizontal oscillator 13 is utilized by the horizontal deflection circuit 17 for generating the scanning signals coupled to the picture tube 6. The usual retrace scanning impulses as seen in graph C of Fig. 2, and indicated by reference numeral 18, are coupled from the horizontal scanning circuit 17 back into the gating circuit 8, this retrace impulse 18 being timed to occur coincident with the auxiliary impulse 12 for a purpose and in a manner to be explained hereafter.

The gating circuit 8 itself is so arranged that the sychronizing impulse 12 will not be communicated to the discriminator 10 unless the retrace pulse 18 occurs, this impulse 18 serving as a gating signal. Thus, if an impulse of noise be fed to the gating circuit, which would produce a wave substantially identical to the wave 11, and if this noise occurred between two retrace pulses 18, this wave produced by the noise will not get through to the discriminator 10 and thereby destroy the synchronized relationship between the oscillator 13 and the occurrence of the horizontal synchronizing signal 3 (or signal 12 which occurs in synchronism with signal 3).

Figure 4:
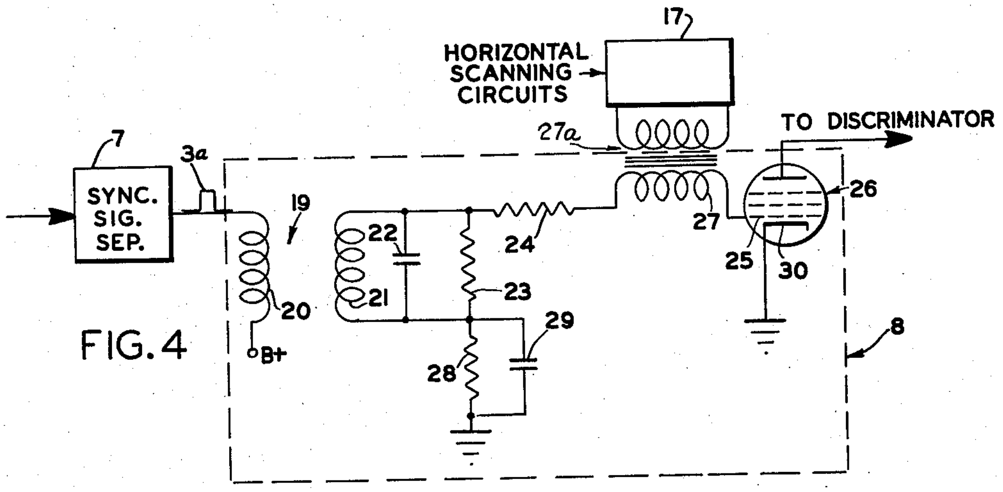
Fig. 4 is a circuit diagram of one portion of Fig. 1.

The circuit for achieving this gate-controlling action is illustrated in Fig. 4. This circuit or synchronizing wave generator includes a transformer generally indicated by the reference numeral 19, having primary and secondary windings 20 and 21 respectively. The horizontal synchronizing signal 3*a*, in phase with impulse 3, produced by the separating circuit 7 is coupled to the primary winding 20 in such a manner as to induce or "excite" a signal in the secondary winding 21. The secondary winding 21 has connected thereacross a condenser 22 and a damping resistor 23, the combination of this winding 21 and the condenser 22 constituting a resonant circuit which is shock excited by the occurrence of the synchronizing pulse 3*a*. The components comprising this resonant circuit which includes the damping resistor 23, are so selected that the wave generated thereby will be rapidly damped, as illustrated in graph B of Fig. 2, so that only the positive half cycle 12 will have a magnitude suitable for the purposes to be explained hereafter. The frequency of this wave 11 is so selected as to cause the appearance of the negative half cycle thereof in substantial time coincidence with the impulse 3 whereby the positive half cycle 12 will occur immediately after the impulse 3 and ahead of trailing edge of the blanking pulse 2.

A coupling resistor 24 connects one side of the inductor or winding 21 to the control grid 25 of a gating tube 26. This coupling is made through a suitable secondary winding 27 provided on the horizontal deflection circuit 17 output transformer 27*a* which is conventionally used to couple the scanning signal to the picture tube 6. It may be stated at this point that the tube 26 may be characterized as a "switch" which selectively controls the conduction of the auxiliary synchronizing pulse 12 to the discriminator 10.

A time constant circuit consisting of a parallel connected resistor 28 and condenser 29 is connected between the lower end of the winding 21 and ground, and the cathode 30 of the tube 26 is also connected to ground. In addition, or alternatively a resistor shunted by a capacitor may be connected between cathode and ground for the purpose of establishing additional grid-cathode bias. The values of the resistor 28 and condenser 29 are so chosen that a cutoff bias will be normally developed on the control grid 25, whereupon the tube 26 will be normally non-conductive. The value of the condenser 29 is sufficiently large as to maintain this cutoff bias between the occurrence of the synchronizing pulses 12 as will become apparent from the following explanation.

In operation, each occurrence of the horizontal synchronizing impulse 3 will produce the damped wave 11 in the resonant circuit 21, 22, 23, and the positive portion 12 thereof is conductively coupled to the control grid 25 through the secondary winding 27. The value of bias applied to the control grid 25 is normally of such value that the amplitude of the impulse 12 is not alone sufficiently positive to cause the tube 26 to conduct, so without the interposition of some other positive voltage, the impulse 12 by itself will have no effect on the tube 26. However, since the synchronizing pulse 12 normally fed to the discriminating circuit 10 from the gate 8 is responsible for the properly phased generation of the retrace pulse 18 by the horizontal deflection circuit 17, it is seen that this impulse 12 and the retrace pulse 18 may occur substantially simultaneously. These positive pulses 12, 18 are, then added and fed to the control grid 25, the addition of these two pulses being of sufficient positive amplitude to overcome the bias on the grid 25 causing the tube 26 to be conductive of the pulse 12. Hence, the retract pulse 18 is used as a gating pulse for conducting the synchronizing signal 12 through the tube 26 to the discriminating circuit 10. Without the instantaneous occurrence of the retrace pulse 18, the synchronizing impulse 12 will not get through to the discriminator 10.

From the foregoing, it will be appreciated that any noise which is effective to produce a wave 11, which occurs in between two retrace pulses 18, will be isolated from the discriminator 10 thereby preventing noise signals from disrupting the synchronization of the oscillator 13 with the occurrence of the true synchronizing wave 12.

Since the synchronizing impulse 12 is utilized to initiate the retrace pulse 18, it is obvious that in normal time relationship the latter pulse cannot occur normally ahead of the pulse 12 without the use of suitable phasing circuitry. However, by the use of the conventional circuits 10, 13 and 16, the iron slug 31 arranged to control the reactance of the discriminating winding 15 may be tuned so as to provide a phase differential between the waves appearing in the respective windings 14 and 15 (see Fig. 3). By proper adjustment of the slug 31, the signal in the winding 15 can be phased ahead of its normal 90 degree relationship to the signal in winding 14, this relationship being represented by the two waves in Fig. 3.

By means of this phasing adjustment, it is now seen that the scanning frequency of the horizontal oscillator 13 virtually leads the occurrence of the pulse 12 which is continuously phased with the signal (Fig. 3) induced in the phase discriminating circuit 10 thereby making it possible for the retrace pulse 18, which is controlled by the oscillator 13, to occur head in time of the leading edge of the synchronizing impulse 12. Now by comparing the phase relationship between the retrace pulse 18 and the blanking pulse 2, it is seen that the proper relationship exists for centering in the usual manner the active scanning portion of the horizontal deflection cycle on the screen of the picture tube 6.

The aforementioned phasing adjustment between the oscillator 13 and the discriminator 10 is made possible by the fact that the correction signal produced by the discriminator is a D. C. potential which is utilized in the automatic frequency controlling circuit 16 to control the bias on a reactance tube included in this circuit, which is in turn coupled to the coil 14 for controlling the frequency of the oscillator 13 in the usual manner.

It would appear from the foregoing description that it would not be necessary to have present the auxiliary synchronizing impulse 12. However, as explained in the beginning, one purpose of this invention is to improve the noise immunity characteristics of the television receiver. Since the resonant circuit consisting of the winding 21, the condenser 22, and the resistor 23 is tuned to produce the desired wave with the occurrence of the synchronizing impulse 3, and since in the conventional systems, any signals getting through to the transformer 19 will have the same amplitude all signals being clipped to a given amplitude ahead of this stage by the separator 7, any noise signal having a frequency characteristic which differs from that of the impulse 3 will excite the resonant circuit 21, 22, 23 to a lesser amplitude than that which occurs as the result of the excitation produced by the pulse 3. By so arranging the components in the gating circuit 8 that the cutoff bias normally impressed on the control grid 25 of tube 26 will be overcome only by the peak portion of the impulse 12 (graph B) which only occurs with the excitation produced by a signal identical to the impulse 3, any wave generated by the resonant circuit having an amplitude less than the true synchronizing amplitude, will be insufficient to make the tube 26 conductive. Thus, the frequency response characteristic of the resonant circuit serves as a noise filter, and with the synchronism between the retrace pulse and the synchronizing pulse 12 in combination with this filtering action, it is seen that a definite appreciable improvement in immunizing the horizontal deflection circuits against the influence of noise signals is provided.

Furthermore, if wave 12 were not used and, instead, the synchronizing pulse 3 were used to open the gate 8, and wave 18 were so phased as to be initiated somewhat ahead (in time relationship) of wave 3, then wave 18 would start before, or coincident with, the start of the blanking pulse 2. In such case, especially under normal conditions of drift of phase of wave 18 when the television receiver ages or becomes warm, a condition of picture "foldover" would occur. Foldover is generally known as a condition wherein active picture time occurs during some portion of scanning retrace, and the observed picture appears to fold back upon itself. Thus, if impulse 18 exists in whole or in part during a time not occupied also by blanking pulse 2, foldover will be present. It is good engineering practice to so limit and position retrace pulse 18 after the start, and before the finish, of the blanking pulse 2. Stated in another way, it is desired to have a "front porch" and a "back porch" on the picture, the "porch" being a darkened area caused by the blanking pulse 2 being in part existent before and after (in time relationship) retrace pulse 18. Thus, pulse 12 being delayed to occur after pulse 3, the retrace pulse 18 can be phased to start some time ahead of pulse 12 without foldover, which is not true if pulse 3 were used for keying the gate instead of pulse 12.

It will now occur to a person skilled in the art that the shock excited resonant circuit in combination with a circuit for producing a gating pulse may be utilized, in other environments for eliminating the effects of unwanted signals, and it is intended that these equivalent uses be covered as determined by the scope of the claims appended hereto.

What is claimed is:

1. A synchronizing circuit for use in a television receiver adapted to utilize a synchronizing signal contained in the video carrier signal for synchronizing the reproduction of a picture comprising a synchronizing wave generator responsive to said synchronizing signal for producing a wave which occurs later in time with respect to said synchronizing signal, a scanning generator operative to produce a scanning signal for use in reproducing the aforementioned picture, automatic frequency control means operatively coupled to said scanning generator and serving to control the frequency of said scanning signal, means whereby said frequency control means is dependent upon said wave for its controlling action, gating means coupling said wave generator and said frequency control means together, means for conducting said scanning signal to said gating means, and means whereby said gating means is responsive to said scanning signal to conduct said wave to said frequency control means only during the occurrence of said scanning signal.

2. A synchronizing circuit for use in a television receiver adapted to utilize a synchronizing signal contained in the video carrier signal for synchronizing the reproduction of a picture comprising a synchronizing wave generator responsive to said synchronizing signal for producing a wave which occurs later in time with respect to said synchronizing signal, a scanning generator operative to produce a scanning signal for use in reproducing the aforementioned picture, automatic frequency control means operatively coupled to said scanning generator and controlling the frequency of said scanning signal, and means whereby said frequency control means is dependent upon said wave for its controlling action, means included in said frequency control means operative to cause said scanning signal to occur in predetermined phase relation with said wave, gating means coupling said wave generator and said frequency control means together, and means for conducting said scanning signal to said gating means, and means whereby said gating means is responsive to said scanning signal to conduct said wave to said frequency control means only during the occurrence of said scanning signal.

3. A synchronizing circuit for use in a television receiver adapted to utilize a synchronizing signal contained in the video carrier signal for synchronizing the reproduction of a picture comprising a synchronizing wave generator responsive to said synchronizing signal for producing a wave which occurs later in time with respect to said synchronizing signal, a scanning generator operative to produce a scanning signal for use in reproducing the aforementioned picture, a frequency discriminating circuit inductively coupled to said scanning generator, an automatic frequency control circuit coupled between said discriminating circuit and said scanning generator, said wave generator being operatively coupled to said discriminating circuit for impressing said wave thereon, means whereby said discriminating circuit is responsive to said wave and to the signal inductively coupled thereto from said scanning generator to generate a control voltage utilized by said automatic frequency control circuit for synchronizing the frequency of said scanning generator with said wave, gating means coupled in between said wave generator and said discriminating circuit, and means whereby said gating means is responsive to said scanning signal to conduct said wave to said discriminating circuit only during the occurrence of said scanning signal.

4. A synchronizing circuit for use in a television receiver adapted to utilize a synchronizing signal contained in the video carrier signal for synchronizing the reproduction of a picture comprising a synchronizing wave generator responsive to said synchronizing signal for producing a wave which occurs later in time with respect to said synchronizing signal, a scanning generator operative to produce a scanning signal for use in reproducing the aforementioned picture, a frequency discriminating circuit inductively coupled to said scanning generator, an automatic frequency control circuit coupled between said discriminating circuit and said scanning generator, said wave generator being operatively coupled to said discriminating circuit for impressing said wave thereon, means whereby said discriminating circuit is responsive to said wave and to the signal inductively coupled thereto from said scanning generator to generate a control voltage utilized by said automatic frequency control circuit for synchronizing the frequency of said scanning generator with said wave, phasing means operatively associated with the inductive coupling between said discriminating circuit and said scanning generator for adjusting the phase of the scanning signal with respect to said wave, gating means coupled in between said wave generator and said discriminating circuit, and means whereby said gating means is responsive to said scanning signal to conduct said wave to said discriminating circuit only during the occurrence of said scanning signal.

5. A synchronizing circuit for use in a television receiver adapted to utilize a synchronizing signal contained in the video carrier signal for synchronizing the reproduction of a picture comprising a synchronizing wave generator responsive to said synchronizing signal for producing a damped sine wave the second half of which occurs later in time with respect to said synchronizing signal, said generator comprising a damped resonant circuit which includes an inductor and capacitance connected in parallel, said synchronizing signal being used to shock excite said resonant circuit for producing said sine wave, circuit means for generating a scanning signal which is used in reproducing the television picture, a gating circuit, and coupling means conductively connected to said circuit means and to said resonant circuit and serving to conduct said half cycle and said scanning signal to said gating circuit which is normally nonconductive, the simultaneous occurrence of said half cycle and said scanning signal serving to cause said gating circuit to conduct, said circuit means being controlled by said gating circuit in response to the periods of conduction thereof for maintaining said scanning signal in synchronism with said half cycle.

6. A synchronizing circuit for use in a television receiver adapted to utilize a synchronizing signal contained in the video carrier signal for synchronizing the reproduction of a picture comprising a synchronizing wave generator responsive to said synchronizing signal for producing a damped sine wave the second half of which occurs later in time with respect to said synchronizing signal, said generator comprising a damped resonant circuit which includes an inductor and capacitance connected in parallel, said synchronizing signal being used to shock excite said resonant circuit for producing said sine wave, circuit means for generating a scanning signal which is used in reproducing the television picture, a gating circuit including a tube having a control grid and a cathode, said control grid being normally biased to cut off, coupling means conductively connected to said circuit means and to said resonant circuit and conducting said half cycle and said scanning signal to said control grid, means whereby the simultaneous occurrence of said half cycle and said scanning signal overcomes said bias and causes said tube to conduct, said circuit means including an inductor connected in series with said control grid and said resonant circuit and means whereby said scanning signal and said half cycle may be simultaneously impressed upon said control grid whereby the signal produced by the conduction period of said tube serves to maintain said scanning signal in synchronism with said half cycle.

7. In a television receiver adapted to receive a composite television signal comprising a video signal, a blanking signal, and a horizontal synchronizing signal which occurs during said blanking signal; a picture signal reproducing tube, a video amplifier circuit conductively connected to said tube, means for impressing said television signal upon said amplifier, a synchronizing signal separating circuit for separating said horizontal synchronizing signal from the television signal, a synchronizing wave generator coupled to said signal separating circuit, means whereby said generator is responsive to the separated horizontal synchronizing signal to produce a wave having a predetermnied shape and phase relationship with respect to said horizontal signal, means whereby said wave is timed to occur during the period of said blanking signal, a horizontal scanning circuit generating a signal in synchronism with said wave, phasing means included in said horizontal scanning circuit for advancing the signal generated thereby in time relation with respect to said wave whereby said signal and said wave will occur simultaneously, a normally nonconductive circuit coupled to said wave generator and to said horizontal scanning circuit, and means whereby said normally non-conductive circuit is responsive to the simultaneous occurrence of said wave and said signal to conduct said wave only, to said horizontal scanning circuit.

8. In a television receiver adapted to receive a composite television signal comprising a video signal, a blanking signal, and a horizontal synchronizing signal which occurs during said blanking signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separating circuit and responsive to the separated horizontal synchronizing signal to produce a wave having a predetermined shape and phase relationship with respect to said horizontal signal, said wave being timed to occur during the period of said blanking signal, a horizontal scanning circuit operative to generate a signal used in the reproduction of a picture by said picture tube in synchronism with the occurrence of said wave, phasing means included in said horizontal scanning circuit for advancing the signal generated thereby in time relation with respect to said wave whereby said signal and said wave will occur simultaneously, an automatic frequency control circuit operatively connected between said wave generator and said scanning circuit operative to control said scanning generator to maintain synchronism between said signal and said wave, and a normally nonconductive circuit coupled to said wave generator and to said horizontal scanning circuit responsive to the simultaneous occurrence of said wave and said wave to be conductive of said wave only, said nonconductive circuit serving to couple said wave generator to said control circuit whereby said wave serves to control the frequency of said signal.

9. In a television receiver adapted to receive a composite television signal comprising a video signal, a blanking signal, and a horizontal synchronizing signal which occurs during said blanking signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separating circuit and responsive to the separated horizontal synchronizing signal to produce a wave having a predetermined shape and phase relationship with respect to said horizontal signal, said generator comprising a resonant circuit which is shock excited by said horizontal signal to produce a damped sine-wave the second half cycle of which constitutes said wave, said parameter being timed to occur during the period of said blanking signal, a horizontal scanning circuit operative to generate a signal used in the reproduction of a picture by said picture tube in synchronism with the occurrence of said wave, phasing means included in said horizontal scanning circuit for advancing the signal generated thereby in time relation with respect to said wave whereby said signal and said wave will occur simultaneously, and a normally nonconductive circuit coupled to said wave generator and to said horizontal scanning circuit responsive to the simultaneous occurrence of said wave and said wave to be conductive of said wave only, said nonconductive circuit serving to couple said wave generator to said horizontal scanning circuit whereby said wave serves to control the frequency of said signal.

10. In a television receiver adapted to receive a composite television signal comprising a video signal, a blanking signal, and a horizontal synchronizing signal which occurs during said blanking signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separating circuit and responsive to the separated horizontal synchronizing signal to produce a wave having a predetermined shape and phase relationship with respect to said horizontal signal, said generator comprising a resonant circuit which is shock excited by said horizontal signal to produce a damped sine-wave the second half of which constitutes said wave, said wave being timed to occur during the period of said blanking signal, a horizontal scanning circuit operative to generate a signal used in the reproduction of a picture by said picture tube in synchronism with the occurrence of said wave, phasing means included in said horizontal scanning circuit for advancing the signal generator thereby in time relation with respect to said wave whereby said signal and said wave will occur simultaneously, an automatic frequency control circuit operatively coupled between said wave generator and said scanning circuit operative to control said scanning generator to maintain synchronism between said signal and said wave, and a normally nonconductive circuit coupled to said wave generator and to said horizontal scanning circuit responsive to the simultaneous occurrence of said wave and said wave to be conductive of said wave only, said nonconductive circuit serving to couple said wave generator to said horizontal scanning circuit whereby said wave serves to control the frequency of said signal.

11. In a television receiver adapted to receive a composite television signal comprising a video signal, a blanking signal, and a horizontal synchronizing signal which occurs during said blanking signal; a picture signal reproducing tube, a video amplifier circuit conductively connected to said tube, means for impressing said television signal upon said amplifier, a synchronizing signal separator circuit for separating said horizontal synchronizing signal from the television signal, a synchronizing wave generator coupled to said signal separating circuit and responsive to the separated horizontal synchronizing signal to produce a wave having a predetermined shape and phase relationship with respect to said horizontal signal, said generator comprising an inductance and capacitance which form a resonant circuit which is shock excited by said horizontal signal to produce a damped sine-wave the second half cycle of which constitutes said wave, said wave being timed to occur during the period of said blanking signal, a horizontal scanning circuit operative to generate a signal used in the reproduction of a picture by said picture tube in synchronism with the occurrence of said wave, phasing means included in said horizontal scanning circuit for advancing the signal generated thereby in time relation with respect to said wave whereby said signal and said wave will occur simultaneously, a normally nonconductive circuit coupled to said wave generator and to said horizontal scanning circuit responsive to the simultaneous occurrence of said wave and said wave to be conductive of said wave only, said nonconductive circuit including an electron discharge device having a control grid and a cathode, said grid having a cut off bias supplied thereto, said resonant circuit operatively coupled to said grid, and an inductor connected between said resonant circuit and said grid and being inductively coupled to said horizontal scanning circuit whereby said signal and said wave may be simultaneously applied to said grid for overcoming said cut off bias and making said electron discharge device momentarily conductive.

12. A synchroizing circuit for a television receiver comprising a source of synchronizing impulses, a wave generator operatively coupled to said source for producing waves which are delayed with respect to said impulses but which are synchronized therewith, gating means operatively coupled to said wave generator and being normally non-conductive of said waves, scanning-signal means for producing scanning signals and being operatively coupled to said gating means, means whereby said scanning-signal means is synchronized by said waves which are conducted by said gating means, feed-back means for coupling at least a portion of said scanning signals to said gating means, means whereby said gating means is rendered conductive when said synchronizing signals coincide in time with said waves, and means whereby said gating means conduct said waves to said scanning-signal means.

13. A synchronizing circuit for a television receiver comprising a source of synchronizing impulses, a wave generator responsive to said impulses for producing waves which are delayed with respect to said impulses, a scanning-signal generator for producing a scanning signal and including an oscillator, means for synchronizing said oscillator with the occurrence of said waves, gating means operatively coupling said wave generator to said scanning-signal generator, said gating means being normally nonconductive, means for feeding back at least a portion of said scanning signal to said gating means, means whereby said gating means is rendered conductive only during the simultaneous occurrence of said waves and said scanning signal, and means whereby said gating means couples said waves to said oscillator for controlling the frequency thereof.

References Cited in the file of this patent

UNITED STATES PATENTS

| | | |
|---|---|---|
| 2,141,343 | Campbell | Dec. 27, 1938 |
| 2,231,792 | Bingley | Feb. 11, 1941 |
| 2,277,000 | Bingley | Mar. 11, 1941 |
| 2,339,536 | Wendt | Jan. 18, 1944 |
| 2,399,421 | Artzt | Apr. 30, 1946 |
| 2,416,424 | Wilson | Feb. 25, 1947 |
| 2,545,346 | Edelsohn | Mar. 13, 1951 |

UNITED STATES PATENT OFFICE

CERTIFICATE OF CORRECTION

Patent No. 2,838,605 June 10, 1958

John F. Bigelow

It is hereby certified that error appears in the printed specification of the above numbered patent requiring correction and that the said Letters Patent should read as corrected below.

Column 8, line 53, for "parameter" read -- wave --.

Signed and sealed this 11th day of November 1958.

(SEAL)

Attest:

KARL H. AXLINE
Attesting Officer

ROBERT C. WATSON
Commissioner of Patents